United States Patent
Parrott et al.

(10) Patent No.: US 11,275,017 B2
(45) Date of Patent: Mar. 15, 2022

(54) HOLIDAY TESTING CIRCUIT FOR COATED SURFACE INSPECTION

(71) Applicant: Saudi Arabian Oil Company, Dhahran (SA)

(72) Inventors: Brian Jonathan Parrott, Thuwal (SA); Sahejad Patel, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 252 days.

(21) Appl. No.: 16/533,479

(22) Filed: Aug. 6, 2019

(65) Prior Publication Data

US 2021/0041348 A1 Feb. 11, 2021

(51) Int. Cl.
*G01N 17/04* (2006.01)
*G01N 17/00* (2006.01)

(52) U.S. Cl.
CPC ........... *G01N 17/04* (2013.01); *G01N 17/006* (2013.01)

(58) Field of Classification Search
CPC ........ G01B 21/08; G01B 7/066; G01N 27/20; G01N 27/24; F16L 2101/30
USPC ........................ 324/501, 551, 557, 663, 700
See application file for complete search history.

(56) References Cited

U.S. PATENT DOCUMENTS

| | | |
|---|---|---|
| 3,339,136 A | 8/1967 | Rasor |
| 2,885,656 A | 5/1969 | Rasor |
| 3,614,605 A | 10/1971 | Eisele |
| 4,048,558 A * | 9/1977 | Goodman ............... G01N 27/20 324/609 |
| 5,369,370 A * | 11/1994 | Stratmann ............... G01N 17/02 324/458 |
| 5,746,905 A * | 5/1998 | Murray ................... G01N 27/02 205/776.5 |

(Continued)

FOREIGN PATENT DOCUMENTS

| | | | |
|---|---|---|---|
| CN | 103983666 A * | 8/2014 | |
| CN | 103983666 A | 8/2014 | |

(Continued)

OTHER PUBLICATIONS

CN103983666 A English Translation (Year: 2021).*

(Continued)

*Primary Examiner* — Vincent Q Nguyen
*Assistant Examiner* — Sean Curtis
(74) *Attorney, Agent, or Firm* — Leason Ellis LLP

(57) ABSTRACT

A system is disclosed for detecting holidays, e.g., defects, in surface coatings applied to metallic assets like a pipe. The system comprises a detection circuit with a test probe having a conductive tip which is moved along the coating during inspection and a DC voltage input signal generator which supplies a switched DC voltage input to the test probe. The detection circuit can be configured to operate using a low and/or high voltage switched DC input voltage signal. A measurement component comprising a sensing resistor and measurement tool is configured to measure a signal response of the detection circuit during inspection and detect holidays based on changes in the signal response caused by electrical properties of the coated surface. The detection circuit is configured such that the probe provides the only area of contact between the circuit and asset and enables detection of holidays without a separate ground connection.

18 Claims, 3 Drawing Sheets

(56) References Cited

U.S. PATENT DOCUMENTS

| | | | | |
|---|---|---|---|---|
| 6,184,691 | B1* | 2/2001 | Prough | G01R 31/1263 324/515 |
| 6,636,031 | B1* | 10/2003 | Kenmochi | G01M 3/40 324/557 |
| 7,077,020 | B2* | 7/2006 | Langley | G01B 5/066 118/669 |
| 7,131,344 | B2* | 11/2006 | Tarumi | F16L 55/28 73/865.8 |
| 7,388,384 | B2* | 6/2008 | Kato | G01R 31/1254 324/536 |
| 7,493,817 | B2* | 2/2009 | Germata | F16L 55/40 324/220 |
| 8,289,031 | B1* | 10/2012 | Rao | G01N 27/205 324/551 |
| 8,310,243 | B2* | 11/2012 | Shukla | G01N 17/02 324/525 |
| 8,633,713 | B2* | 1/2014 | Langley | G01N 27/24 324/663 |
| 8,652,312 | B2* | 2/2014 | Catte | C23F 13/04 204/404 |
| 9,109,991 | B2* | 8/2015 | Yang | G01N 17/04 |
| 10,571,388 | B2* | 2/2020 | Jaworowski | G01N 27/041 |
| 2004/0207394 | A1* | 10/2004 | Harthorn | G01N 29/265 324/216 |
| 2005/0057258 | A1* | 3/2005 | Colahan | G01N 27/205 324/501 |
| 2007/0006670 | A1* | 1/2007 | Brown | G01N 27/82 73/865.8 |
| 2007/0120572 | A1* | 5/2007 | Chen | G01N 17/04 324/700 |
| 2008/0048682 | A1* | 2/2008 | Brusco | G01B 21/08 324/700 |
| 2012/0038376 | A1* | 2/2012 | Shukla | G01N 17/02 324/700 |
| 2012/0256643 | A1* | 10/2012 | Langley | G01B 7/066 324/663 |
| 2014/0318959 | A1* | 10/2014 | Yang | G01N 17/04 204/404 |
| 2015/0115976 | A1* | 4/2015 | Adams | G01N 21/8914 324/554 |
| 2016/0334325 | A1* | 11/2016 | Jaworowski | G01N 17/02 |
| 2019/0353581 | A1* | 11/2019 | Asada | G01N 17/02 |
| 2021/0041348 | A1* | 2/2021 | Parrott | G01N 17/006 |
| 2021/0172860 | A1* | 6/2021 | Al-Khaldi | C23F 13/06 |

FOREIGN PATENT DOCUMENTS

| | | | | |
|---|---|---|---|---|
| CN | 108181230 A | * | 6/2018 | |
| EP | 3570007 A1 | * | 11/2019 | G01N 27/048 |
| WO | WO-2018140148 A2 | * | 8/2018 | G01N 27/20 |
| WO | WO-2021026236 A1 | * | 2/2021 | G01N 17/006 |

OTHER PUBLICATIONS

International Search Report and Written Opinion in Corresponding PCT Application No. PCT/US2020/045009 dated Oct. 30, 2020. 12 pages.

* cited by examiner

HOLIDAY TESTING CIRCUIT FOR COATED SURFACE INSPECTION

FIELD OF THE DISCLOSURE

The present disclosure is directed to an apparatus and method for inspecting coated metal surfaces for defects in the coating and more particularly to electrical testing circuits using electrical impulses for detecting defects in the coating.

BACKGROUND OF THE DISCLOSURE

Metallic assets such as pipes and structural members are often coated in order to prevent or minimize corrosion from occurring as a result of exposure to environmental hazards. A primary purpose of these coatings is to prevent electro-chemical reactions that occur when metal surfaces are exposed to water and undergo redox reactions that have the net effect of converting metals to metal oxides. Pinholes or defects in a coated surface, also referred to as a "holiday," allow exposure of the surface underneath the coating and, as a result, accelerated corrosion reaction can occur resulting in significant localized corrosion that might even be more rapid than corrosion occurring on the same asset in uncoated form. Therefore, it is important to ensure that there are no holidays on a coated asset.

In order to detect holidays, conventional methods rely on connectivity of a circuit connected 1) an exposed portion of the asset (e.g., a ground connection), and 2) a brush-like inspection probe moving along the coating and applying an electrical signal to the coated asset. In such systems, a holiday in the otherwise insulative coating allows for the electrical signal to be conducted through the asset, resulting in the testing circuit being connected or closed. However, in a fully coated asset, or an asset in which the exposed ground connection portion is far away from the inspection probe, such as when inspecting the inside of a coated pipeline, it can be difficult to provide a ground connection. This makes the conventional technique difficult to achieve or otherwise inconvenient. Additionally, there are various types of holidays that exist that pose a detection challenge for existing holiday testers. Some examples of these holidays are: Very small holes that cannot be penetrated by the brush or electrically conductive element (e.g. sponge/water); areas where the coating is very thin, areas where there is a bubble in the coating, thus making it functionally much thinner than desired; areas where the coating has not melted or formed properly and remains dry/un-polymerized.

SUMMARY OF THE DISCLOSURE

According to an aspect of the present disclosure, there is provided a device for detecting defects in a coating applied to a surface of a metallic asset. The device comprises a detection circuit including a probe having a conductive tip configured to be moved along the coated surface of the asset during inspection. The detection circuit also includes a switched input signal generator for providing a switched input signal to the conductive probe. Additionally, the detection circuit includes a measurement device for measuring a signal response of the detection circuit. In particular, the signal response is a function of the switched input signal and one or more electrical properties of the coated surface of the asset contacted by the conductive tip. Furthermore, the detection circuit is configured to detect a holiday based on the measured signal response and without any common ground connection between the detection circuit and the metallic asset.

According to another aspect of the present disclosure, there is provided a device for detecting defects in a coating applied to a surface of a metallic asset. The device comprises a detection circuit, including a probe having a conductive tip configured to be moved along the coated surface of the asset during inspection. The detection circuit also includes a power source and a switched input signal generator. The switched input signal generator is configured to generate a high-voltage switched input signal using the power source and output the high-voltage switched input signal to the conductive probe. In particular, during operation, the signal generator and probe are configured to create a voltage potential at the conductive tip suitable for arcing between the asset and the conductive tip when the conductive tip is proximate to a defect in the coating. The detection circuit also includes a sensing resistor and a measurement device for measuring a signal response of the detection circuit. More specifically, the signal response is a change in one or more electrical parameters of the switched input signal as a function of arcing between the asset and the conductive tip. Furthermore, the detection circuit is configured to detect arcing based on the measured signal response, thereby detect the existence of a holiday. Additionally, the detection circuit is configured to detect arcing without reference to any common ground connection between the detection circuit and the metallic asset.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

DESCRIPTION OF CERTAIN EMBODIMENTS OF THE DISCLOSURE

Given the state of the art, what is needed in the art are holiday testing circuit designs which eliminate the need for the ground connection. What is also needed are testing circuits capable of detecting the various types of holidays that can be challenging to detect (e.g., small holes, thin coatings, bubbled or poorly formed coatings). It is with respect to these and other considerations that the disclosure made herein is presented.

By way of overview and introduction, the present application describes systems and methods for detecting "holidays" (e.g., defects like pin-holes) in the surface coatings applied to metallic assets like a pipe.

Conventional holiday detection devices rely on a testing circuit having a ground connection to an exposed portion of the asset and having a detection probe that is moved along the coated surface such that, when the detection probe contacts a holiday, a closed circuit is formed between the detection probe and the ground connection enabling detection of the holiday. By comparison, improved holiday testing circuits are disclosed herein which eliminate the need for the ground connection and only require a single point/area of contact between the inspection probe, typically a "brush," and the asset pipe. The exemplary embodiments of a holiday testing circuit can simplify use and, as a further benefit, are not affected negatively by large coating thickness.

Figure 1A:
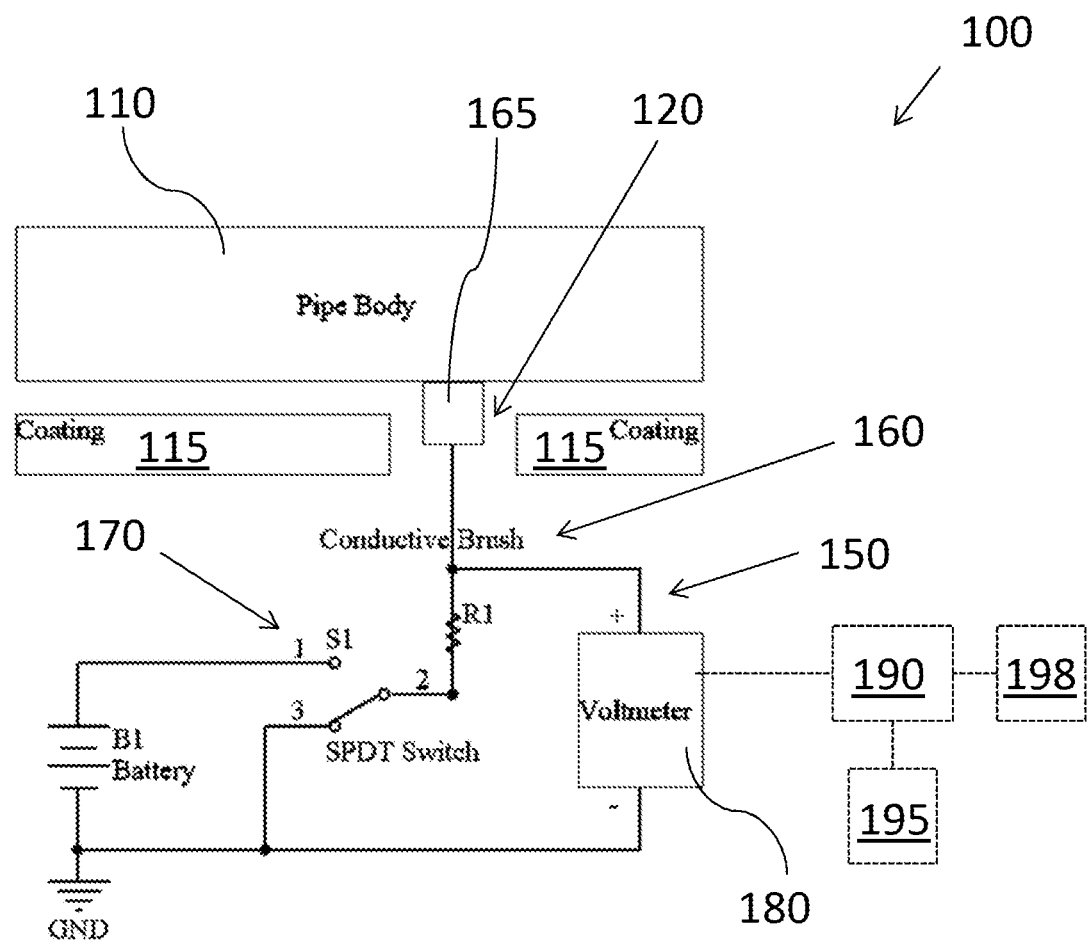
FIG. 1A is a high-level diagram illustrating an exemplary configuration of a system for surface coating inspection according to an embodiment.

FIG. 1A is a schematic representation of an exemplary system for surface coating inspection 100 in accordance with an embodiment. The system 100 includes a holiday testing circuit 150 and is shown in the context of a practical application, namely, inspecting the coating 115 applied on a surface of a pipe 110 for holidays, which is shown in FIG. 1A as a void 120 in the coating.

The particular holiday testing circuit 150 shown and described in connection with FIG. 1A is configured to operate using a direct current voltage source B1 that supplies a relatively low voltage (e.g., 5V-10V as further described herein). The circuit 150 includes a switching DC voltage generator 170 that provides a switched DC input voltage signal to a test probe 160. As shown, the switching DC voltage generator 170 can include, for example, a single pole double throw switch.

The test probe 160 can include a conductive tip 165, such as a conductive brush, that is moved along the coating 115 during inspection. For example, the conductive brush 165 can be an electrolyte-soaked sponge, a multifilament brush, or even a single wire, as well as any other mechanism that would allow conductivity to be established from the probe to the metallic pipe through small holes in the coating of the pipe surface.

The circuit 150 also includes an electrical measurement tool 180 for measuring one or more properties of the electrical signal through the probe 160, which is a function of the switched DC input voltage signal and the electrical properties of the surface inspected using the conductive tip 165 of the probe. For instance, the measurement tool 180 can be any instrument suitable for measuring the current flow through the probe 160 and/or voltage and can be configured to detect holidays in the coating as a function of the measured transient voltage and/or current flow.

More specifically, in the exemplary configuration shown in FIG. 1A, the holiday testing circuit 150 is configured to operate on the principle that the pipe 110 acts as a capacitor, essentially, a large charge accumulator. As the voltage applied to the brush 165 is switched between a voltage-high and ground by the switching generator 160, the rate of increase and decrease of the signal through the probe can be measured by a high-speed voltage measurement tool 180 (e.g. an Analog to Digital Converter) and that measured signal response analyzed to detect holidays. When the brush 165 reaches a holiday and conducts into the metallic substrate of the pipe 110 through the defect 120 in the coating 115, the switching of the applied voltage between the local ground of the inspection circuit and applied voltage will become slower than when no holiday is present, as much more current must flow before the voltage reaches the source voltage at the switch 170. Additionally, if the frequency of the switching signal is fast enough, peak voltage also decreases upon the occurrence of a holiday.

In addition or alternatively to using a voltmeter as the measurement tool 180, a current sensor could be used in series with R1 for measuring current flow. In such a configuration, the current sensor measurements would show relatively more current flowing when holidays are reached (and over a longer period of time) thereby allowing for detection of holidays as a function of the measured current. It should be understood that the circuit 150 is shown in FIG. 1A in a simplified form and can include additional components that facilitate the exemplary systems and methods for surface coating inspection. For example, circuit 150 can be communicatively coupled to a processor that is configured by executing encoded instructions to analyze the measured signal response, record the measured information in a computer-readable storage medium and generate audible and/or visual alerts for the operator via a suitable display or audio-output device.

Figure 1B:
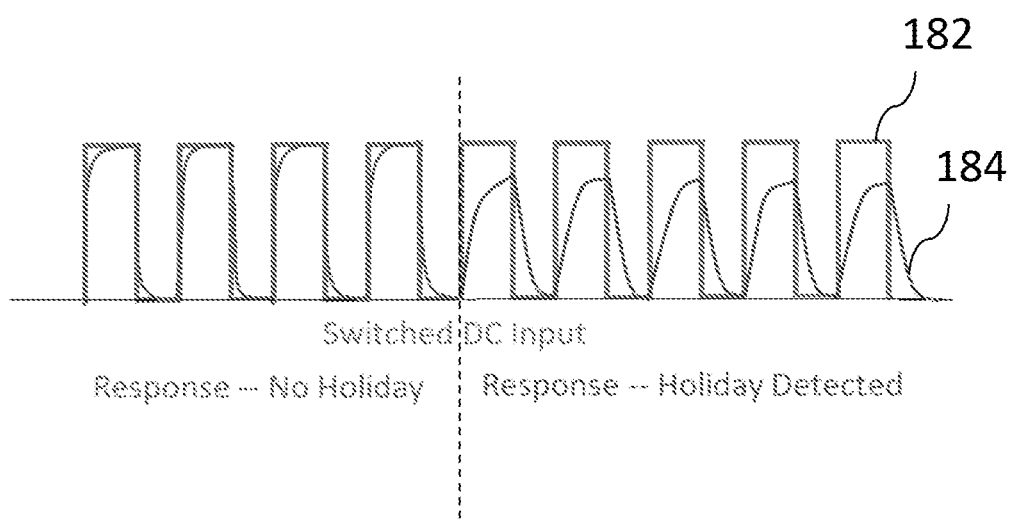
FIG. 1B is a graphical illustration of an exemplary switched DC input signal generated by the system of FIG. 1A and the measured signal response in the absence of a holiday and in the presence of a holiday.

FIG. 1B is a graphical illustration of an exemplary switched DC input signal 182, which in this example is a DC voltage square wave, and the signal response 184 measured at the probe 150. FIG. 1B illustrates the potential change in response measured by the voltmeter as a result of the probe 165 being in contact with the pipe (i.e., detecting a holiday) versus the response when the coating is intact.

The particular configuration of the testing circuit 150 shown in FIG. 1A is provided as a non-limiting example and alternative circuit configurations and components can be used without departing, from the scope of the present disclosure. It should also be understood that the circuit configuration, the type of components that are used and their electrical properties can be adjusted to suit the requirements of the intended application. For instance, the size of the resistor R1, the frequency of the DC pulses output by the switching DC voltage generator 170, and the amplitude of the DC voltage all contribute to the rise time characteristics of the circuit and can be tuned accordingly. Preferably, the circuit 150 is configured such that the maximum voltage would be reached when the coating is intact and would not be reached when a holiday is present in the coating, as such a configuration could be used to detect a holiday and inform the user based on peak voltage. However, this ideal case is not necessary for the system for surface coating inspection 100 to work as relative changes in the measured signal response are useable to detect holidays and generate alerts.

In addition or alternatively, what is shown as a battery B1 and switch 170 of circuit 150 could be any voltage source that is capable of producing switching signal and, more preferably, a square wave at high frequencies. While tuning may optimize the results, signal frequencies in the 10-100 kHz range and voltages in the 5-10V range work well when paired with a 180K Ohm resistor, R1. If the effective capacitance of the pipe can be established, desired characteristics of the signal can be tuned by changing input signal frequency, resistance R1, or signal voltage. As would be understood, the tuning of such parameters can be accomplished by any variety of software and/or hardware-based adjustments to the testing circuit. For instance, the frequency of the input signal can be software controlled, the resistance R1 can be defined using hardware (e.g., adjustable resistors) and the voltage can be controlled using hardware and/or software, as would be understood. Accordingly, the particular frequency, voltage and resistance values and ranges provided herein should not be interpreted as limiting and are to provide some guidance on an exemplary working solution.

The exemplary systems for surface coating inspection and testing circuits described herein can implement various approaches for measuring the signal response of the testing circuit and detecting holidays. For instance, as previously noted, instead of using a voltmeter as the measuring tool 180, a current sensor could be used in line with resistor R1 for measuring current flow. By way of further example, resistor R1 could itself be used as a current sensor along with a voltmeter measuring the voltage drop across it. Additionally, the current sensor could be configured with additional software or hardware for measuring cumulative current flow, not just instantaneous readings, thus simplifying the analysis of how much current flowed into the blush over time and detection of holidays.

Holiday detection using a voltage sensor voltmeter) can also be based on peak voltage measurements and/or average voltage measurements, for instance, by first measuring the voltage (peak and/or average) under a non-holiday condition and then monitoring changes in the measured voltage so as to detect a holiday when the measured voltage achieved during each cycle drops below a threshold for more than a cycle period. However, such a configuration works best when the testing circuit 150 is tuned to respond as shown in FIG. 1B, that is, with sufficient resistance to prevent the input voltage from being reached during the cycle period. Alternatively, a high-speed voltmeter could be utilized to detect the rise-time characteristics following the initiation of each pulse and thus detect holidays based on the occurrence of slower rise times caused by a holiday. In such a configuration, the rise time could be measured by a timing system in which a timer controlling the switch tracks the time until a specific voltage was reached. Such tracking can be performed, fir example, using a reversed diode having a specific break-down voltage that is less than the input voltage and that is configured to trigger a digital signal upon reaching the break-down voltage at the conductive brush. A corresponding processor could also be provided and configured to compare the time of the trigger signal to the start time of the switched input voltage signal and detect a holiday if the time until the specific voltage was reached is longer than a prescribed threshold time by a given amount.

It should be understood the exemplary systems for surface coating inspection described herein can include additional hardware and software components that implement or enhance the features and functionality of the testing circuits described herein. For example, as shown in FIG. 1A, the measurement device of the testing circuit can include or be operatively connected to a computing device 190 configured to perform the measured signal analysis and holiday detection functions. Such a computing device can be implemented using any suitable data processing device (e.g., a single or multicore processor, microprocessor or microcontroller) and can be configured to perform the various data analysis operations and otherwise control operation of the inspection device by executing coded instructions stored in a non-transient computer memory or storage component (e.g., a solid-state memory or storage device, not shown). The processor can also be configured to store measured signal data and related information within the memory or storage element. Additionally, the processor can interface with other peripheral devices such as a location detection device 195 configured to measuring the location of the probe during inspection such that the processor can record, in memory, the measured location of the probe in response to detecting a holiday. By way of further example, the inspection systems can include a visual and/or audio output device 198 of the any type that is suitable for conveying information to a system operator. Accordingly, the processor can be further configured to generate alerts upon detection of a holiday and output the alerts and other information concerning the holiday detection to an operator via the visual and/or audio output device(s). It should be further understood that, although not shown, various other peripheral devices can be incorporated into the exemplary detection systems such as network communications devices or user interfaces for providing instructions to the processor and defining operational parameters relating to holiday detection.

Figure 2:
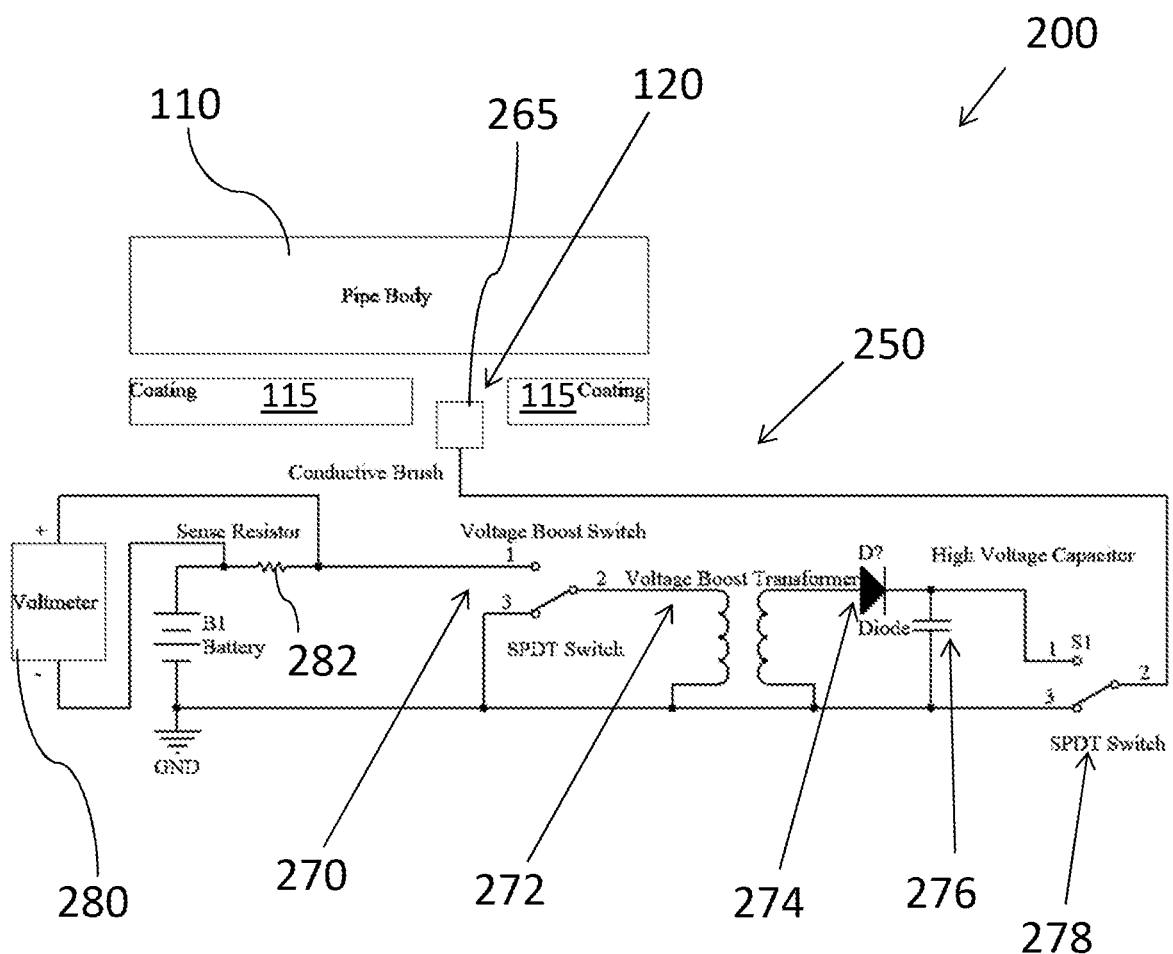
FIG. 2 is a high-level diagram illustrating an exemplary configuration of a system for surface coating inspection according to an embodiment.

The exemplary low-voltage circuit 150 described in connection with FIG. 1A above allows for accurate detection of uncoated versus coated surfaces. FIG. 2 is a schematic diagram that illustrates another exemplary configuration of a system for surface coating inspection 200. While operating on a similar principal as testing circuit 150 shown in FIG. 1A, the circuit 250 is configured to apply applying a switched high voltage to the inspected surface coating 115 of a pipe 110 via a probe having a conductive brush 265. The circuit 250 is configured to output a high-voltage in order to create the potential of arcing between the brush and the pipe body through any small air gaps where a holiday 120 exists and detect arcing. This configuration enables detection of very small holidays without needing the probe to physically contact the pipe body through a void caused by a holiday. The holiday testing circuit 250 of system 200 can thus be suitable for detecting holidays that are otherwise difficult to detect, for example, small holes, thin coatings, bubbled or poorly formed coatings.

While having a similar general configuration as the exemplary low-voltage testing circuit 150, the testing circuit 250 shown in FIG. 2A includes additional components along with modifications for enabling detection of higher-than-logic level voltages, such as using a current sense resistor 282 for detection of time-dependent changes in the input signal caused by contact/electrical connection between probe 265 with the pipe body. In the exemplary testing circuit 250 configuration shown in FIG. 2, the primary difference is the addition of voltage-boosting circuitry that enables the circuit 250 to generate high voltages, specifically, a voltage boost switch 270, transformer 272, diode 274 and high voltage capacitor 276. The transformer and or switch can be modified or utilized to control the voltage level achieved on the high voltage capacitor. Additionally, the capacitor 276 can be sized to store only sufficient power to create a minimum arc of electricity through the maximal gap resistance that is being targeted at the voltage level that will be used.

Circuit 250 implements a similar basic principle as described for circuit 150, namely, providing a switched input signal to the probe 265 such that when an electric connection is created between the brush 265 and the pipe body 110 through arcing, the capacitance of the pipe serves to create a measurable change in the electrical parameters of the testing circuit 250. In particular, as shown in FIG. 2, the measurable change for the testing circuit 250 comprises additional current flow that can be detected using a voltmeter 280 that is configured to measure voltage across the sense resistor 282 provided on the low-voltage side of the circuit 250. In operation, when a holiday 120 is contacted, the current flow would increase dramatically. In some configurations, the testing circuit can be configured such that detection of a holiday triggers the signal generating switches to stop alternating, so as to prevent further arcing. By way of further example, a non-arcing switch 278, such as a solid-state relay shown in FIG. 2, can be provided on the high-voltage end of the circuit to prevent further arcing in response to detecting a holiday.

It should be understood that the approach for generating the high voltage signal is not limited to the particular voltage boost switch 270, transformer 272, diode 274 and high voltage capacitor 276 configuration shown in FIG. 2. However, it can be preferable that the testing circuit 250 is configured such that the current flow on a low-voltage side of the circuit can be measured, as the current is used to generate the high voltage and current flow varies based upon the output of the high-voltage side of the circuit.

Figure 3:
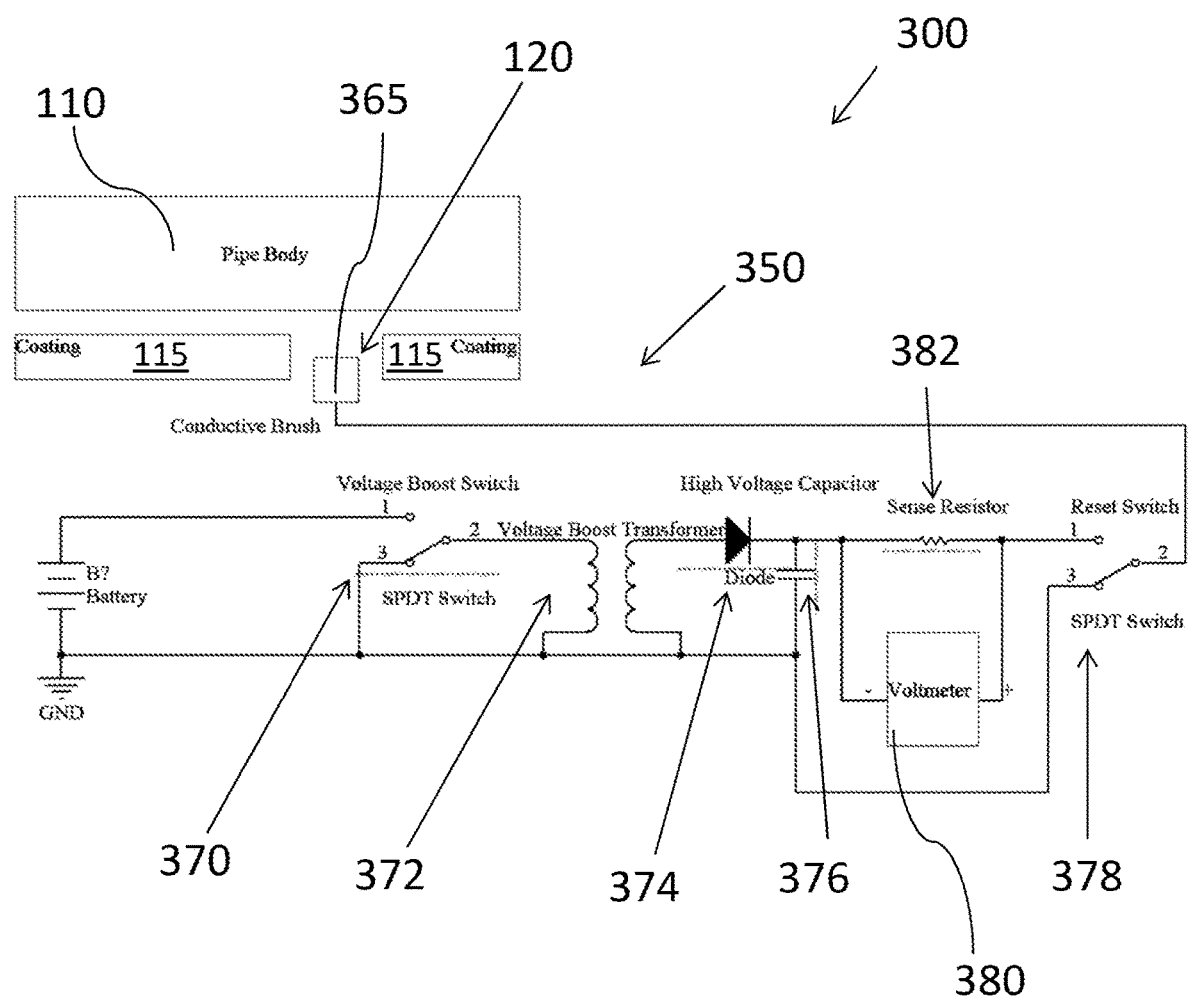
FIG. 3 is a high-level diagram illustrating an exemplary configuration of a system for surface coating inspection according to an embodiment.

While circuit 250 is described as detecting holidays based on the current flow that can be measured using voltmeter 280, various approaches for measuring the signal response of the testing circuit 250 and detecting holidays can be implemented. For instance, FIG. 3 is schematic diagram of a testing circuit 350 that is a variation of the testing circuit 250. The testing circuit 350 is similar in design as circuit 250, except that circuit 350 is configured to measure current flow on the high-voltage end of the circuit rather than the low-voltage side. Specifically, sense resistor 382 is provided on the high-voltage side of the circuit and the voltmeter 380 measures voltage and current across the sense resistor.

As further shown in FIG. 3A, the circuit 350 can include a final switch (reset switch) 378 configured to trigger upon detection of a holiday, as the detection of the holiday will cause the pipe body and or charged brush to equalize their potentials. The switch can be configured to reconnect the brush 365 to the local ground level (i.e., the ground GND of the inspection device 300) and, in doing so while the brush remains connected to the pipe 110, the pipe body and tool can readjust to create equilibrium of voltage potential between the ground state and the pipe body. As such, the circuit 250 is ready to create an arc when a new holiday is contacted by the then charged conductive brush 265. Additionally, the circuit 350 can be configured to alternate the reset switch 378 and measure the current flow in a way similar to the low-voltage testing circuit 150. However, a non-arcing switch, such as a solid-state relay used in circuit 250, would preferably be used in such a configuration.

As can be appreciated the holiday testing circuits 150, 250 and 350 are configured to operate by applying a electrical signal to a conductive probe in contact with or in proximity to the coating and pipe body and without having a separate electrical connection between the circuit and the pipe body 110. Accordingly, such testing circuit configurations only require a single point/area of electrical contact between the inspection probe and the coating/asset during inspection and eliminates the need for a ground connection between the testing circuit and the metallic asset during operation.

At this juncture, it should be noted that although much of the foregoing description has been directed to systems and methods for surface coating inspection, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system, processes and computer implemented control methods, computer system, and computer program product for surface coating inspection. The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s).

It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A device for detecting defects in a coating applied to a surface of a metallic asset, the device comprising:
    a detection circuit, including
        a probe having a conductive tip configured to be moved along the coated surface of the metallic asset during inspection,
        a switched input signal generator for providing a switched input signal to the conductive probe,
        a measurement device for measuring a signal response of the detection circuit, wherein the signal response is a function of the switched input signal and one or more electrical properties of the metallic asset and the coated surface of the metallic asset contacted by the conductive tip, and wherein the measurement device is electrically coupled to the probe and a local ground of the switched input signal generator, wherein the signal response is a time-dependent change in one or more electrical parameters of the switched input signal as a function of a capacitance of the metallic asset and the coated surface of the metallic asset contacted by the conductive tip, and
wherein the detection circuit is configured to detect a holiday based on the measured signal response due to the contact by the conductive tip and without any additional electrical connection between the detection circuit and the metallic asset.

2. The device of claim 1, wherein the signal response is one or more of:
a transient voltage magnitude,
a rise time of a voltage measured at the probe relative to the local ground,
a rate of change of the measured voltage over time, and
an amount of current flowing through the probe over time.

3. The device of claim 2, wherein the detection circuit further comprises a processor operatively connected to the measurement device, wherein the processor is configured to compare the measured signal response to a baseline signal response, wherein the baseline signal response is the signal response of the circuit measured in the absence of a holiday.

4. The device of claim 3, wherein the processor is configured to detect a holiday upon the measured signal response differing from the baseline signal response by a prescribed amount.

5. A device for detecting defects in a coating applied to a surface of a metallic asset, the device comprising:
a detection circuit, including
a probe having a conductive tip configured to be moved along the coated surface of the metallic asset during inspection;
a switched input signal generator for providing a switched input signal to the conductive probe;
a measurement device for measuring a signal response of the detection circuit, wherein the signal response is a function of the switched input signal and one or more electrical properties of the metallic asset and the coated surface of the metallic asset contacted by the conductive tip, and wherein the signal response is one or more of:
a transient voltage magnitude,
a magnitude of current flow through the probe,
a rate of change of the measured voltage over time, and
an amount of current flowing through the probe over time; and
a processor operatively connected to the measurement device, wherein the processor is configured to compare the measured signal response to a baseline signal response, wherein the baseline signal response is the signal response of the circuit measured in the absence of a holiday,
wherein the detection circuit is configured to detect a holiday based on the measured signal response and without any common ground connection between the detection circuit and the metallic asset,
wherein the detection circuit is configured to measure one or more of a peak voltage and an average voltage, and wherein during operation the processor is configured to monitor changes in the measured voltage and detect a holiday when the voltage achieved during a given cycle period drops below a threshold voltage.

6. The device of claim 5, wherein the measurement device is a high-speed voltage measurement tool.

7. The device of claim 1, wherein the measurement device is a current sensor in series with the probe and configured to measure current flowing through the probe.

8. The device of claim 1, wherein the detection circuit further includes a sensing resistor in series with the conductive tip and wherein the measurement device configured to measure one or more of voltage across the resistor and current through the resistor.

9. The device of claim 1, wherein the input signal is a switched DC voltage signal.

10. A device for detecting defects in a coating applied to a surface of a metallic asset, the device comprising:
a detection circuit, including
a probe having a conductive tip configured to be moved along the coated surface of the metallic asset during inspection;
a switched input signal generator for providing a switched input signal to the conductive probe, wherein the input signal is a square wave having a switching frequency in the range of 10 kHz-100 kHz and a peak voltage in the range of 5-10V;
a measurement device for measuring a signal response of the detection circuit, wherein the signal response is a function of the switched input signal and one or more electrical properties of the metallic asset and the coated surface of the metallic asset contacted by the conductive tip, and wherein the signal response is one or more of:
a transient voltage magnitude,
a magnitude of current flow through the probe,
a rate of change of the measured voltage over time, and
an amount of current flowing through the probe over time; and
a processor operatively connected to the measurement device, wherein the processor is configured to compare the measured signal response to a baseline signal response, wherein the baseline signal response is the signal response of the circuit measured in the absence of a holiday,
wherein the detection circuit is configured to detect a holiday based on the measured signal response and without any common ground connection between the detection circuit and the metallic asset.

11. The device of claim 1, wherein the input signal is a high-voltage switched input voltage signal.

12. The device of claim 11, wherein the high-voltage switched input voltage is configurable to create an electrical arc between the probe and the coated metallic asset if the coating is less than a specified thickness.

13. The device of claim 1, further comprising an output device operatively connected to the detection circuit, wherein the output device is configured to generate an alert in response to detection of a holiday by the detection circuit.

14. A device for detecting defects in a coating applied to a surface of a metallic asset, the device comprising:
a detection circuit, including
a probe having a conductive tip configured to be moved along the coated surface of the metallic asset during inspection,
a power source,
a switched input signal generator configured to generate a high-voltage switched input signal using the power source and output the high-voltage switched input signal to the conductive probe, wherein during operation the signal generator and probe are configured to create a voltage potential at the conductive tip suitable for arcing between the metallic asset and the conductive tip when the conductive tip is proximate to a defect in the coating, a sensing resistor, a measurement device for measuring a signal response of the detection circuit, wherein the signal response is a change in one or more electrical parameters of the switched input signal as a function of arcing between the metallic asset and the conductive tip, wherein the measurement device measures one or more of a voltage and a current across the sensing resistor, and wherein the sensing resistor is provided at one of:

a low-voltage side of the detection circuit wherein the low-voltage side is between a power source and the switched input signal generator, and a high-voltage side of the detection circuit wherein the high-voltage side is between the switched input signal generator and the probe, wherein the detection circuit is configured to detect arcing based on the measured signal response, thereby detect the existence of a holiday, and wherein the detection circuit is configured to detect arcing without reference to any common ground connection between the detection circuit and the metallic asset.

15. The device of claim 14, wherein the measurement device is configured to measure time-dependent changes in the input signal caused by arcing.

16. The device of claim 14, wherein the measurement device is configured to measure current through the sensing resistor and wherein the detection circuit is configured to detect a holiday upon measuring an increase in the measured current relative to a baseline current value.

17. The device of claim 14, further comprising:

a location sensor configured to measure a location of the probe during inspection; and a processor operatively connected to the measurement device and the location sensor, and wherein the processor is configured to record the location of the probe upon detection of a holiday.

18. The device of claim 17, further comprising: an output device operatively connected to the processor, wherein the processor is further configured to generate an alert in response to detection of a holiday and output the alert using the output device.

* * * * *